US007594459B2

(12) United States Patent
Miller et al.

(10) Patent No.: US 7,594,459 B2
(45) Date of Patent: Sep. 29, 2009

(54) SAWING APPARATUS WITH DEBRIS COLLECTION SYSTEM AND ACCESSORY SHELF

(75) Inventors: David Miller, Tupelo, MS (US); Robert D. Donovan, Mooreville, MS (US); Delwyn N. Pounders, Saltillo, MS (US); Jerry W. Ford, Plantersville, MS (US)

(73) Assignee: Delta International Machinery Corp., Jackson, TN (US)

( * ) Notice: Subject to any disclaimer, the term of this patent is extended or adjusted under 35 U.S.C. 154(b) by 512 days.

(21) Appl. No.: 10/990,694

(22) Filed: Nov. 17, 2004

(65) Prior Publication Data

US 2005/0087049 A1 Apr. 28, 2005

Related U.S. Application Data

(62) Division of application No. 09/134,854, filed on Aug. 14, 1998, now Pat. No. 6,899,004.

(51) Int. Cl.
*B23D 45/06* (2006.01)
*B26D 7/18* (2006.01)
*B27B 5/16* (2006.01)

(52) U.S. Cl. .......................... 83/165; 83/167; 83/477.2; 144/252.1; 29/102

(58) Field of Classification Search .................. 83/104, 83/105, 162, 165, 438, 477.2, 440, 446, 467.1, 83/468, 468.7, 522.17, 522.18, 522.19, 100, 83/167; 29/DIG. 79, DIG. 102; 144/252.1, 144/252.2, 286.1, 286.5, 287, 253.1, 253.5; 33/443, 446

See application file for complete search history.

(56) References Cited

U.S. PATENT DOCUMENTS

| | | | | | |
|---|---|---|---|---|---|
| 7,087 | A | * | 2/1850 | Norcross | 144/117.1 |
| 20,539 | A | * | 6/1858 | Baker | 83/356.3 |
| 496,886 | A | * | 5/1893 | Matthews | 83/112 |
| 1,387,869 | A | | 8/1921 | Royle | |
| 1,495,248 | A | * | 5/1924 | Cheshire | 83/165 |
| 1,583,879 | A | | 5/1926 | Hallock | |
| 1,619,227 | A | * | 3/1927 | Widell et al. | 83/40 |
| 1,763,333 | A | | 6/1930 | Vivarttas | |
| 1,864,840 | A | | 6/1932 | Lehner | |
| 2,057,488 | A | * | 10/1936 | Hochstadt | 83/106 |
| 2,109,057 | A | * | 2/1938 | Billker et al. | 83/102 |

(Continued)

OTHER PUBLICATIONS

*Wood* magazine, Feb. 1997, issue No. 95, "Rip Fence Roundup", p. 53.

(Continued)

*Primary Examiner*—Clark F. Dexter

(57) ABSTRACT

A sawing apparatus and a saw fence. The saw apparatus may include a work surface. The saw may include a rail system disposed along the edges of the work surface, for the attachment of accessories thereto. The saw may be provided with workpiece guide adapted to be attached to the rail system for guiding workpieces during the operation of the saw. The workpiece guide may also be provided with an infeed extension that rides on the rail system and is capable of supporting workpieces during the operation of the saw. The infeed extension may be adjustable relative to the work surface of the saw. The saw may further be provided with a debris collection system for the collection of debris produced by the cutting operations of the saw.

22 Claims, 13 Drawing Sheets

U.S. PATENT DOCUMENTS

| | | | | | |
|---|---|---|---|---|---|
| 2,166,703 | A | | 7/1939 | Boice | |
| 2,184,898 | A | * | 12/1939 | Seybold | 83/415 |
| 2,267,937 | A | | 12/1941 | Mattison | |
| 2,364,011 | A | * | 11/1944 | Wales | 83/140 |
| 2,364,334 | A | * | 12/1944 | Wold | 83/165 |
| 2,555,217 | A | | 5/1951 | Young | |
| 2,562,246 | A | | 7/1951 | Van Dam et al. | |
| 2,677,400 | A | | 5/1954 | Gaskell | |
| 2,722,243 | A | | 11/1955 | Nagy | |
| 2,758,617 | A | * | 8/1956 | Taylor | 144/253.8 |
| 2,806,493 | A | | 9/1957 | Gaskell | |
| 2,866,368 | A | * | 12/1958 | Ostrow | 79/16 |
| 3,269,433 | A | | 8/1966 | Packard et al. | |
| 3,406,728 | A | | 10/1968 | Rost | |
| 4,068,551 | A | | 1/1978 | Kreitz | |
| 4,106,381 | A | | 8/1978 | Kreitz | |
| 4,201,256 | A | | 5/1980 | Truhan | |
| 4,206,910 | A | | 6/1980 | Biesemeyer | |
| 4,208,934 | A | * | 6/1980 | Wall | 83/468 |
| 4,248,115 | A | | 2/1981 | Brodbeck et al. | |
| 4,265,284 | A | | 5/1981 | Taylor | |
| 4,336,733 | A | * | 6/1982 | Macksoud | 83/477.2 |
| 4,341,247 | A | | 7/1982 | Price | |
| 4,367,665 | A | | 1/1983 | Terpstra et al. | |
| 4,410,023 | A | | 10/1983 | Vasquez | |
| 4,468,993 | A | * | 9/1984 | McCown et al. | 83/112 |
| 4,566,510 | A | | 1/1986 | Bartlett et al. | |
| 4,599,927 | A | | 7/1986 | Eccardt et al. | |
| 4,600,184 | A | | 7/1986 | Ashworth | |
| 4,627,478 | A | | 12/1986 | Gamble | |
| 4,658,687 | A | | 4/1987 | Haas et al. | |
| 4,694,720 | A | | 9/1987 | Brickner, Jr. et al. | |
| 4,696,213 | A | | 9/1987 | Conneally | |
| 4,817,482 | A | | 4/1989 | Dunaway, Jr. et al. | |
| 4,817,693 | A | | 4/1989 | Schuler | |
| 4,961,269 | A | | 10/1990 | Luttmer et al. | |
| 4,964,450 | A | | 10/1990 | Hughes et al. | |
| 5,042,348 | A | | 8/1991 | Brundage et al. | |
| 5,063,805 | A | | 11/1991 | Brundage | |
| 5,092,058 | A | | 3/1992 | Luttmer et al. | |
| 5,116,249 | A | | 5/1992 | Shiotani et al. | |
| 5,123,317 | A | | 6/1992 | Barnes, Jr. et al. | |
| 5,158,001 | A | | 10/1992 | Udelhofen et al. | |
| 5,174,349 | A | | 12/1992 | Svetlik et al. | |
| 5,181,446 | A | | 1/1993 | Theising | |
| 5,181,448 | A | | 1/1993 | Terpstra | |
| 5,218,894 | A | * | 6/1993 | College et al. | 83/23 |
| 5,237,896 | A | | 8/1993 | Albright et al. | |
| 5,579,671 | A | * | 12/1996 | Bowlin | 83/75.5 |
| 5,582,225 | A | | 12/1996 | Schank | |
| 5,647,258 | A | | 7/1997 | Brazell et al. | |
| 5,722,308 | A | | 3/1998 | Ceroll et al. | |
| 5,755,148 | A | | 5/1998 | Stumpf et al. | |
| 5,768,966 | A | | 6/1998 | Duginske | |
| D404,404 | S | | 1/1999 | Lane et al. | |
| 6,032,564 | A | * | 3/2000 | Bowlin | 83/508.3 |

OTHER PUBLICATIONS

Delta Instruction Manual; Precision Saw Guide; 29" Capacity (Model 36-921) 50" Capacity (Model 36-924), dated Nov. 22, 1995.

Delta Instruction Manual; 10" Contractor's Saw (Model 34-444), dated Jul. 31, 1995.

Delta Instruction Manual; 10" Contractor's Saw II (Model 36-630), dated Jan. 31, 1996.

Delta Instruction Manual; Unifence Saw Guide 30" Capacity (Model 36-905), dated Jan. 15, 1996.

Delta Instruction Manual; Unifence Saw Guide 52" Capacity (Model 36-906), dated Jan. 10, 1996.

* cited by examiner

SAWING APPARATUS WITH DEBRIS COLLECTION SYSTEM AND ACCESSORY SHELF

CROSS-REFERENCE TO RELATED APPLICATIONS

This non-provisional application for patent is a divisional patent application of U.S. patent application Ser. No. 09/134,854, filed Aug. 14, 1998, now U.S. Pat. No. 6,899,004, the disclosure of which is herein incorporated by reference.

BACKGROUND OF THE INVENTION

1. Field of the Invention

The present invention relates to sawing apparatus including a work surface for supporting a workpiece, and more particularly relates to a powered table saw including a rail system for positioning of a fence on the work surface of the saw and that may further include a dust collection system for channeling and collecting dust created during the sawing operation. The present invention also relates to a device for positioning a workpiece on the work surface of a sawing apparatus and more particularly relates to a table saw fence for positioning a workpiece on the work surface of the saw relative to the circular blade of the saw including an adjustable integral support member for at least partially supporting the workpiece when it is being advanced along the work surface of the table saw.

2. Description of the Invention Background

Presently available workpiece fences adapted for use with powered table saws typically are not constructed so as to support the workpiece during cutting operations. In particular, the presently available table saw fences do not provide adequate and effective support to a workpiece when performing lengthwise or "rip" cuts. Predictably, individuals have sought to address this need by introducing aftermarket table saw fences that include additional elements for the purpose of supporting the workpiece during such cutting operations. However, such devices have proven to be ineffective for a number of reasons. In particular, they fail to provide consistent support to the workpiece throughout their surfaces, they generally are difficult to adjust relative to the plane of the work surface of the saw, and they may at least partially obstruct the area in front of the saw that is normally occupied by the operator.

Compounding the relative lack of utility of many of the available table saw fences is the fact that presently available table saws, and other sawing or cutting devices including work surfaces, generally do not provide convenient means for securing accessory devices, such as workpiece fences and the like, to the work surface. In particular, existing table saws employ a variety of rails and/or brackets to secure workpiece fences and other work holding and positioning accessories to the work surface. In particular, the design of commonly available table saw rails do not provide for rapid readjustment of the workpiece fence during cutting operations. In addition, the commonly available rails often require a gap between the table saw's work surface and the rail. This gap provides a channel through which objects resting on the work surface may fall or in which such objects may become trapped.

In addition, commonly available powered table saws typically lack effective means for providing for the disposal of debris produced by the cutting operations. In particular, in commonly available powered table saws, debris produced by cutting operations, for example saw dust, stock, and other scrap, falls from the work surface to the floor areas beneath and around the perimeter of the saw, thereby complicating clean up and generally lending an untidy appearance to the workshop.

Accordingly, there exists a need for a workpiece fence for a powered table saw, and other sawing devices having a work surface, which provides a conveniently adjustable means for at least partially supporting a workpiece when it is being advanced along the work surface and which does not significantly obstruct the area occupied by an operator.

There also exists a need for a sawing apparatus or other cutting including an improved rail system.

There is still another need for a saw dust/saw scrap collection system that does not allow such material to collect beneath and around the perimeter of the table saw or other sawing device.

SUMMARY OF THE INVENTION

In accordance with a particularly preferred form of the present invention, there is provided a workpiece guide for guiding and supporting workpieces during cutting operations of a cutting device having at least one rail and a work surface. In a preferred form, the workpiece guide comprises an elongate body and an infeed extension integral thereto.

Another embodiment of the present invention comprises a saw. The saw further comprises a work surface, a rail system, and a workpiece guide. The work surface comprises a substantially horizontal plane having an infeed side and an outfeed side. The rail system comprises an infeed rail disposed along the infeed side of the work surface and an outfeed rail disposed along the outfeed side of the work surface. The workpiece guide is slidably disposed on the rail system and comprises an elongated body having an infeed end and an outfeed end and an infeed extension.

Yet another embodiment of the present invention includes a saw comprising a support structure, a housing, and a debris collection system. The housing is positioned atop the support structure and comprises a cutting member adapted to cut workpieces. The debris collection system is attached to the support structure and positioned beneath the housing. The debris collection system comprises an inclined flow surface having a lower edge and at least one side edge.

The present invention also comprises a saw for cutting workpieces having a work surface and a rail system. The work surface has an infeed side and an outfeed side. The rail system comprises an infeed rail having a U-shaped cross-section disposed adjacent to the infeed side of the work surface and an outfeed rail having an L-shaped cross section disposed adjacent to the outfeed side of the work surface.

It is a feature of the present invention to provide a workpiece guide for a cutting device having a unique infeed surface that provides consistent support to a workpiece during cutting operations.

It is another feature of the present invention to provide a workpiece guide for a saw having a unique infeed surface that is easily and readily adjustable relative to the work surface of the saw.

It is yet another feature of the present invention to provide a unique workpiece guide for a saw having a work surface that does not significantly obstruct the area occupied by the operator of saw.

Yet another feature of the present invention is to provide a workpiece guide for a saw having a work surface that provides a more convenient apparatus for securing the workpiece guide to the work surface of the saw prior to cutting operations and for readjusting the workpiece guide to the work surface of the saw during cutting operations.

It is another feature of the present invention to provide an improved saw rail system for securing accessories, including a workpiece guide, to the work surface of the saw prior to cutting operations and for readjusting such accessories during cutting operations.

It is yet another feature of the present invention to provide a unique rail system for a saw that may be positioned immediately adjacent to and abutting the work surface of the saw.

It is another feature of the present invention to provide a novel debris collection system for a saw that does not allow such material to collect beneath and around the perimeter of the saw.

Accordingly, the present invention provides solutions to the shortcomings of prior sawing apparatus, workpiece guides, and debris collection systems. Those of ordinary skill in the art will readily appreciate, however, that these and other details, features and advantages will become further apparent as the following detailed description of the preferred embodiments proceeds.

BRIEF DESCRIPTION OF THE DRAWINGS

In the accompanying Figures, there are shown embodiments of the present invention wherein like reference numerals are employed to designate like parts and wherein.

DETAILED DESCRIPTION OF THE PREFERRED EMBODIMENTS

Figure 1:
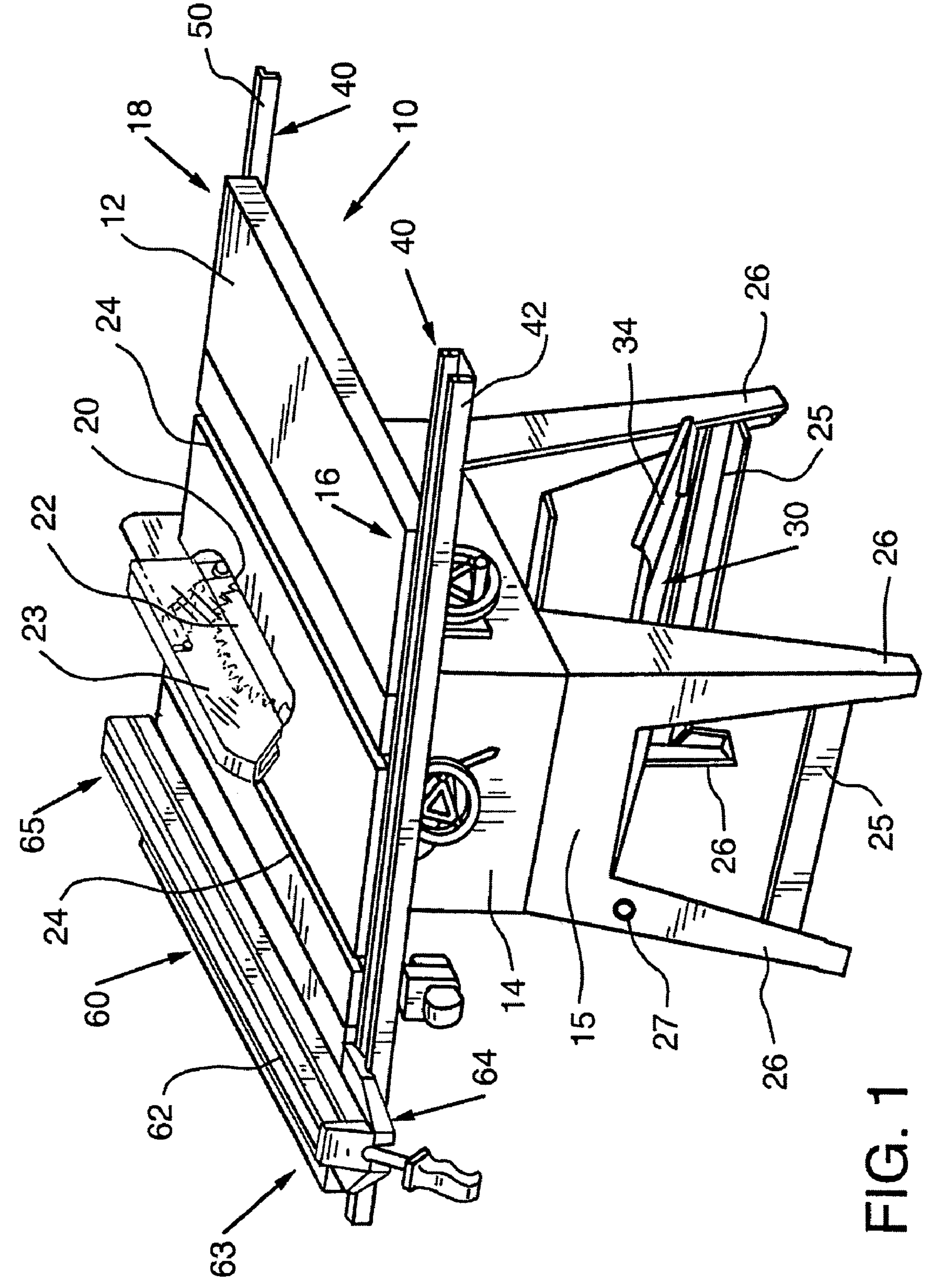
FIG. 1 is a right side perspective view of an embodiment of the workpiece guide system and debris collection system of the present invention in use on a powered table saw.
Figure 2:
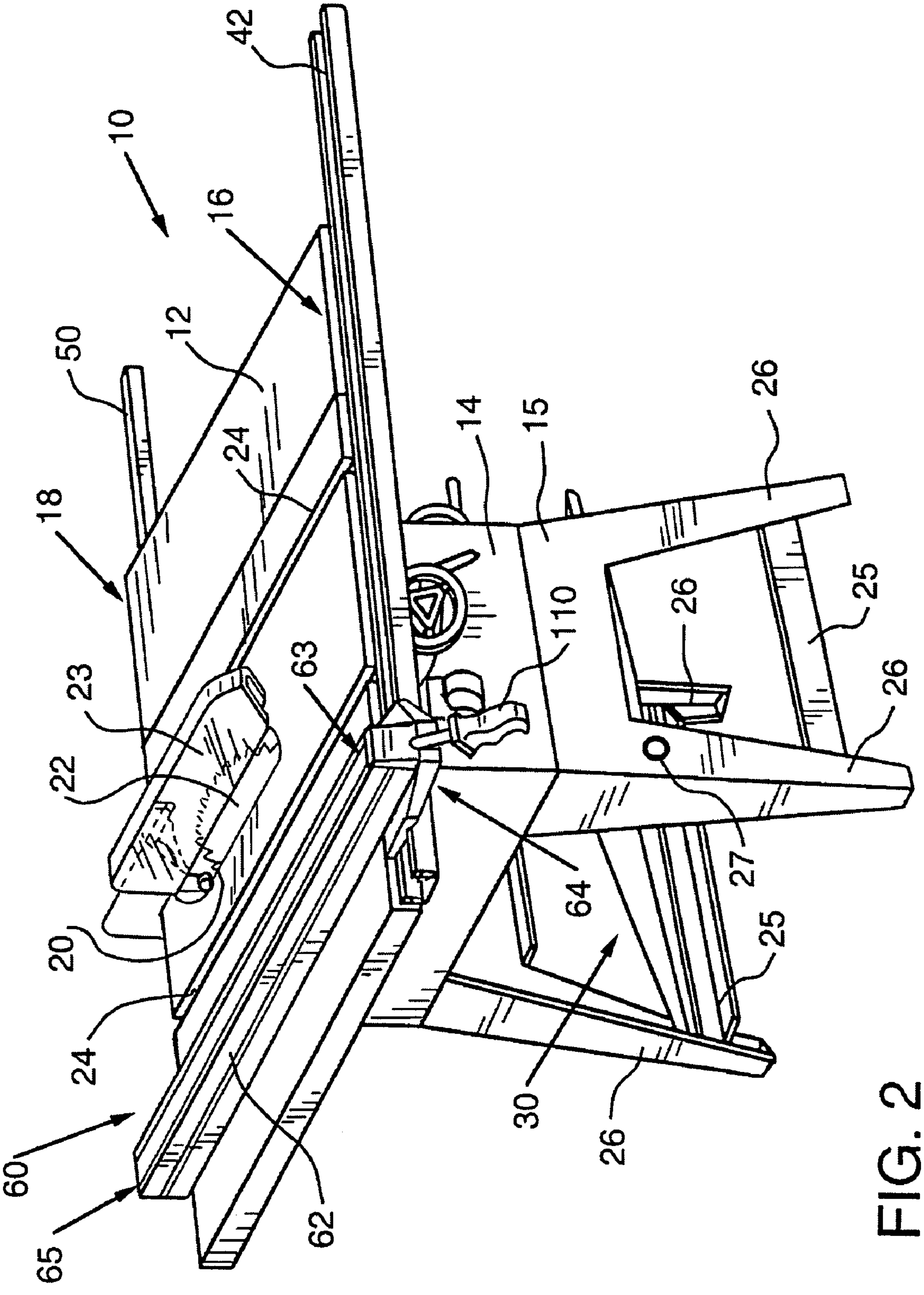
FIG. 2 is a left side perspective view of the powered table saw of FIG. 1, including the workpiece guide system and debris collection system depicted in FIG. 1.
Figure 3:
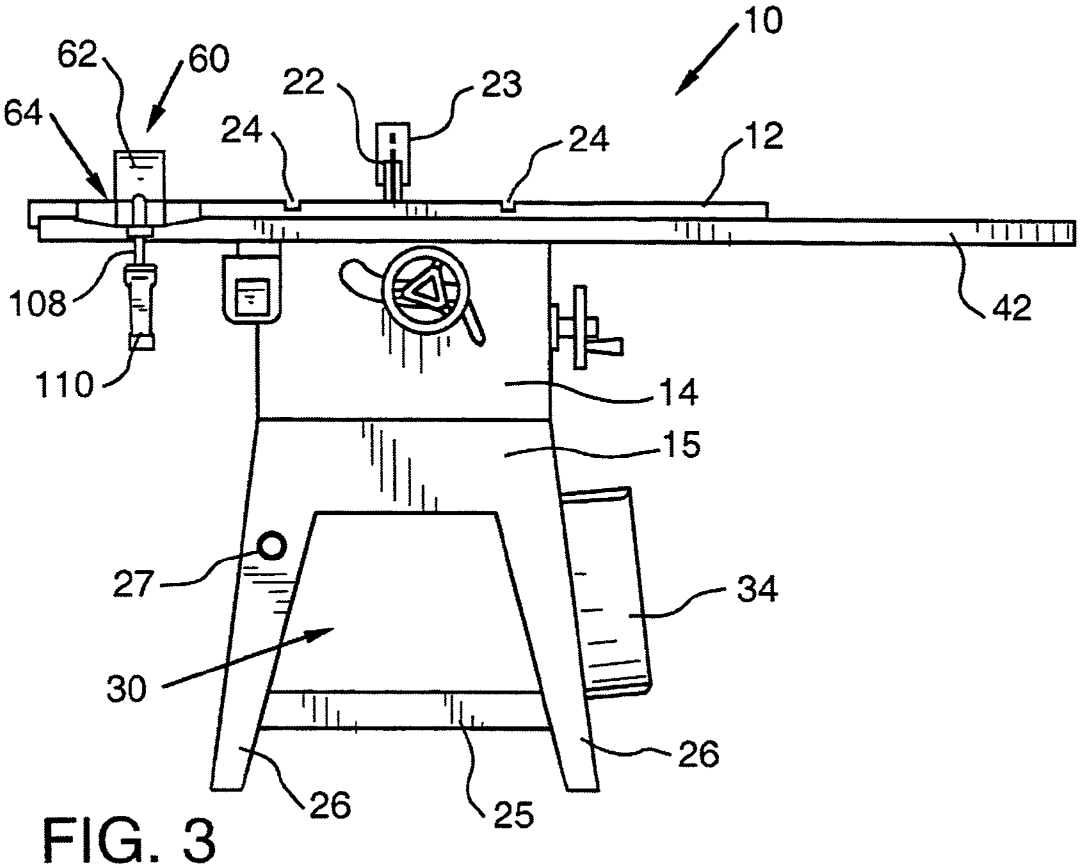
FIG. 3 is an infeed side elevational view of the powered table saw of FIG. 1, including the workpiece guide system and debris collection system depicted in FIG. 1.
Figure 4:
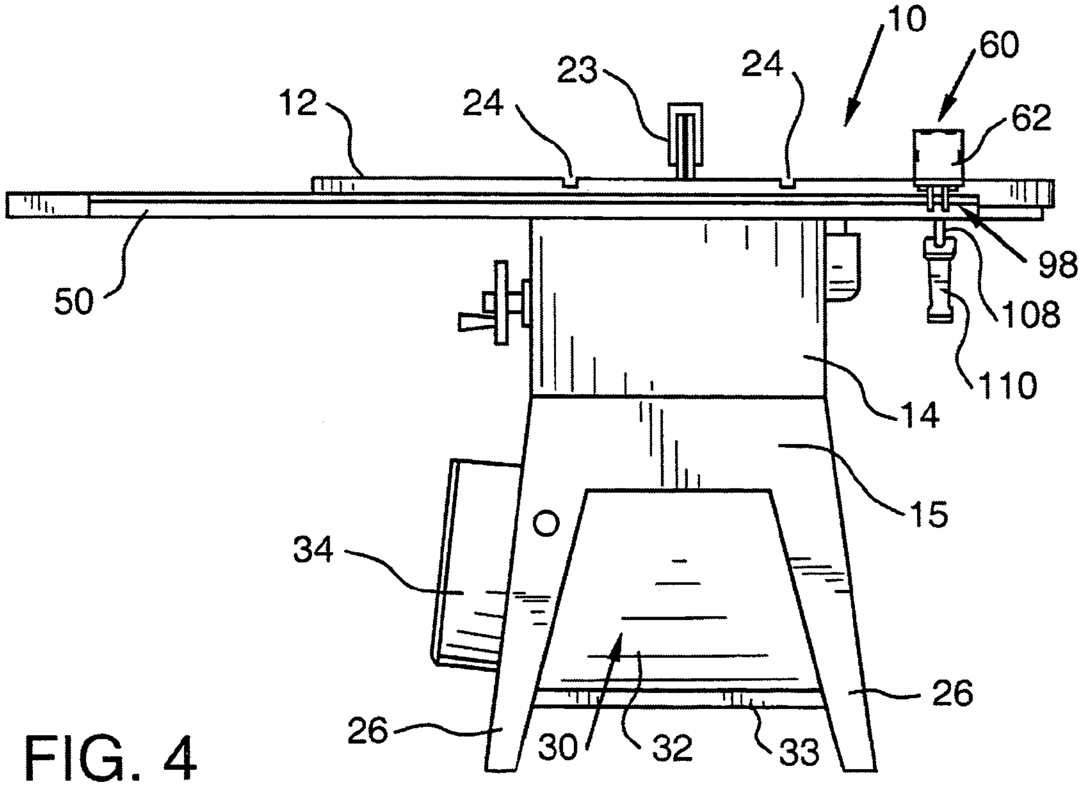
FIG. 4 is an outfeed side elevational view of the powered table saw of FIG. 1, including the workpiece guide system and debris collection system depicted in FIG. 1.
Figure 5:
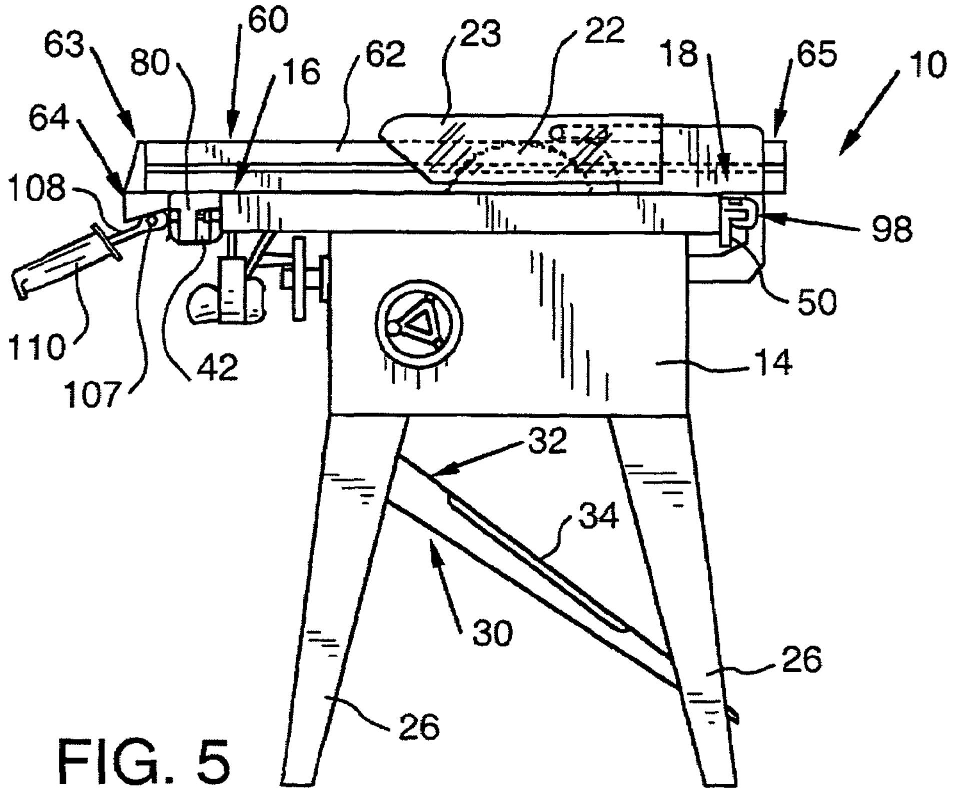
FIG. 5 is a right side elevational view of the powered table saw of FIG. 1, including the workpiece guide system and debris collection system depicted in FIG. 1.
Figure 6:
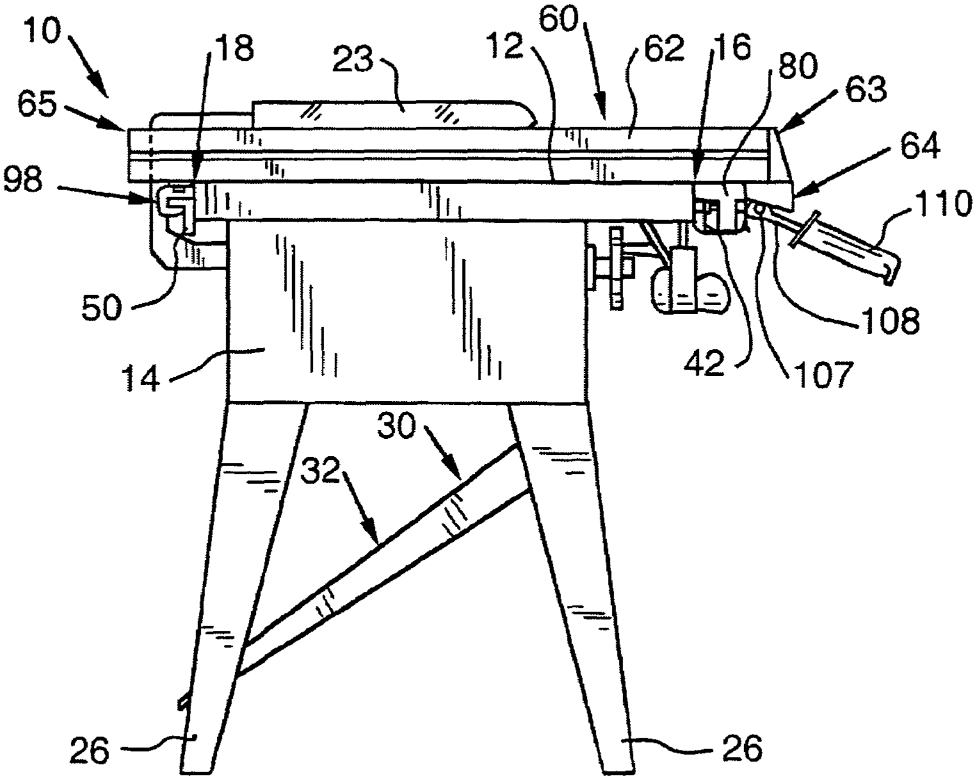
FIG. 6 is a left side elevational view of the powered table saw of FIG. 1, including the workpiece guide system and debris collection system depicted in FIG. 1.
Figure 7:
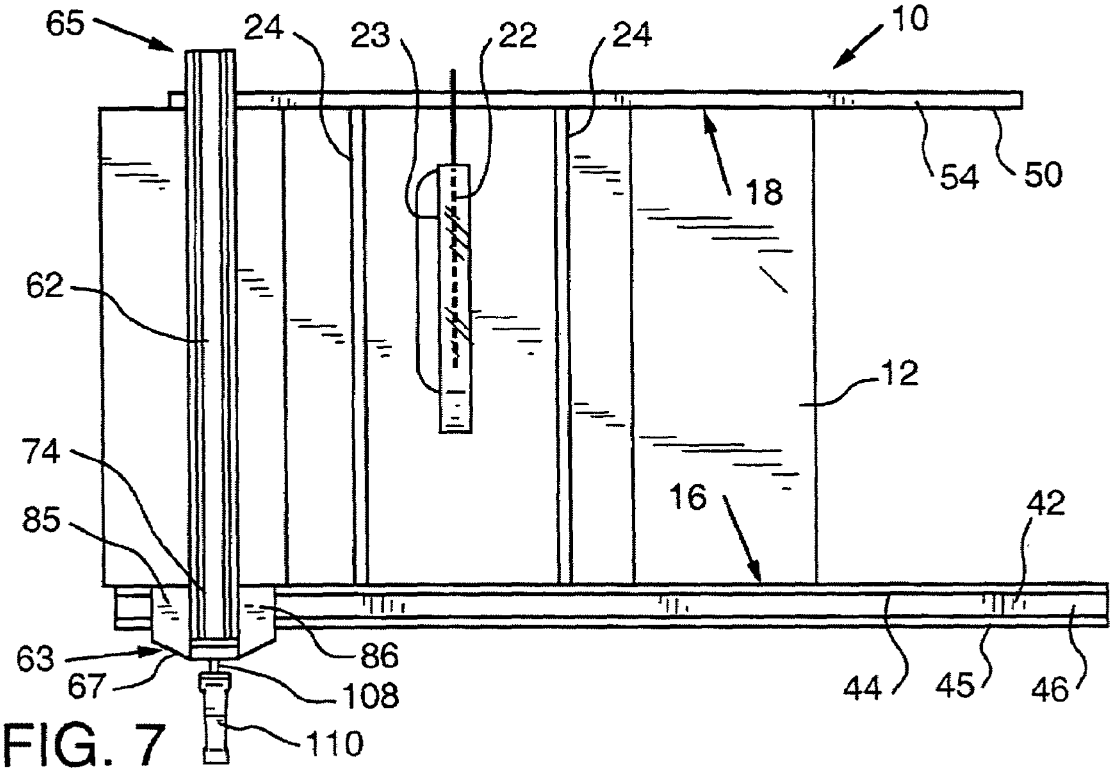
FIG. 7 is a top view of the powered table saw of FIG. 1, including the workpiece guide system and debris collection system depicted in FIG. 1.
Figure 8:
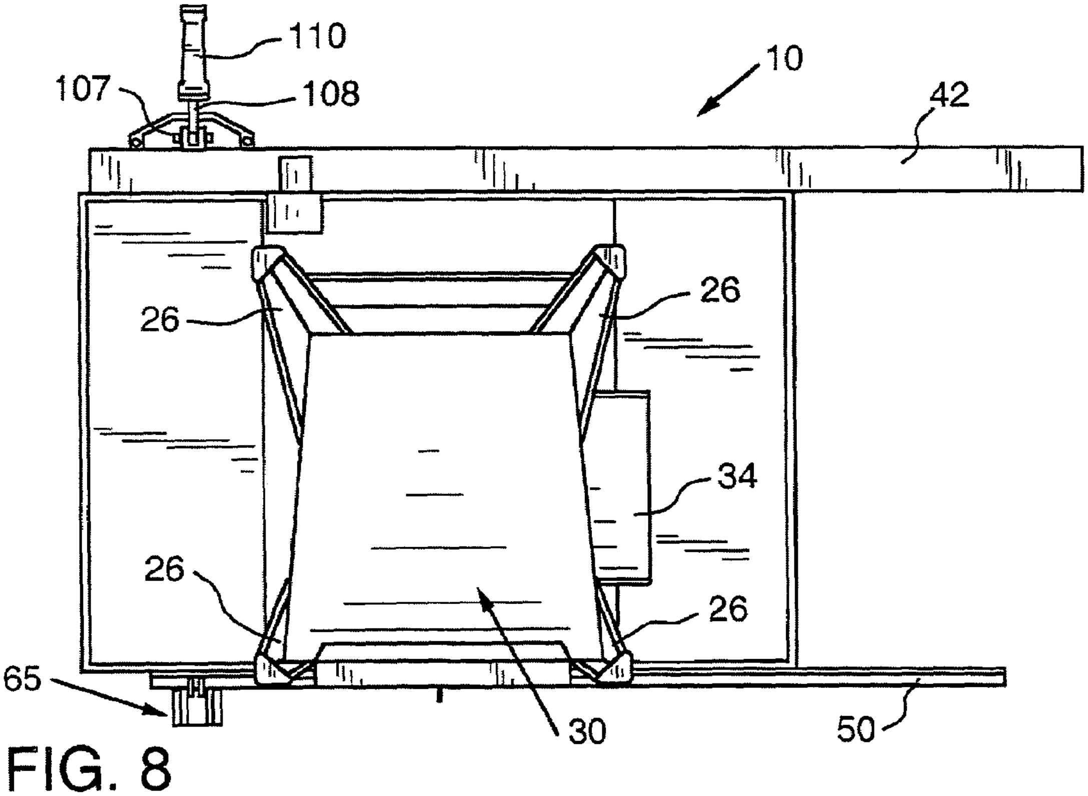
FIG. 8 is a bottom view of the powered table saw of FIG. 1, including the workpiece guide system and debris collection system depicted in FIG. 1.

Referring now to the drawings for the purpose of illustrating embodiments of the inventions only and not for the purposes of limiting the same, the figures show the present inventions adopted for use in connection with a powered table saw 10. While the present inventions are particularly well-suited for use in connection with a powered table saw 10, one of ordinary skill in the art will appreciate that the present inventions may be successfully employed in connection with various other types of saws and cutting devices having workpiece support surfaces, such as miter saws, band saws, and the like. Accordingly, the protection afforded to the inventions claimed herein may not be limited solely to their use in connection with a table saw 10 of the type depicted in the present figures. Because the general mode of operations of powered table saws is well known, only those features of the table saw 10 that are helpful in illustrating the mode of embodiments of the present inventions are discussed below.

The table saw 10 depicted in FIGS. 1-8 includes a work surface 12, a housing 14, and a support structure 15. The work surface 12 includes a rectangular-shaped, generally planar surface formed from a rigid material such as steel or the like and having opposite, generally parallel infeed and outfeed edges 16 and 18, respectively. The infeed and outfeed edges 16 and 18 have been referred to in that manner because it is typically the case that a workpiece being advanced along the work surface 12 is first advanced past the infeed edge 16 and then passes the outfeed edge 18 after exiting the circular cutting member 22. The work surface 12 further includes a slot 20 therethrough that has a longitudinal axis that is generally perpendicular to the infeed and outfeed edges 16 and 18. The slot 20 is adapted to allow a cutting member 22 to protrude therethrough, and the slot 20 will include an insert therein (not shown), having a shape corresponding to the portion of the cutting member 22 that protrudes through slot 20, to at least partially prevent the passage through the work table 12 of material cut by the cutting member. In the case of table saw 10, the cutting member 22 is a circular blade that is journaled for rotation within slot 20 about a shaft (not shown). A cutting member guard 23 is typically provided over the cutting member 22. The work surface 12 further may include one or more channels 24 running parallel to the plane of the cutting member 22 and perpendicular to the infeed and outfeed edges 16 and 18, and which may accept a miter gauge (not shown).

The work surface 12 is supported by and affixed atop the housing 14. In addition to supporting the work surface 12, the housing 14 generally provides a cavity for placement of the saw's motor and other control equipment. The housing 14 in the embodiment of table saw 10 depicted in the figures includes a supporting framework, four sides, and an open bottom. Accordingly, it will be appreciated that sawdust, cut stock, and other small debris that is produced by the cutting member 22 and falls through work surface 12 may pass through the housing 14 without becoming trapped therein.

The housing 14 is supported atop support structure 15. The support structure 15 includes four legs 26, formed from a rigid material such as steel or the like, and adapted and sized to support the housing 14 and work surface 12 in a generally horizontal position. The legs 26 may also include at least one storage bore 27 therethrough. The storage bore 27 is adapted to accept and store therein a variety of saw accessories when they are not in use including, for example, a miter gauge (not shown). The support structure 15 may additionally include cross-members 25 affixed amongst and between the legs 26, using for example, bolts, screws, rivets, welds, or the like, to increase the stability and rigidity of the support structure 15. In an alternative, the cross-members 25 and legs 26 are formed from a one-piece design by, for example, stamping.

The support structure 15 may also include a unique and novel debris collection system comprising a debris chute 30. A preferred configuration of debris chute 30 of the present invention will now be described with reference to FIGS. 1-10. As can be seen in particular in FIGS. 1-8, the debris chute 30 is affixed to the legs 26 and disposed immediately beneath the open button of the saw housing 14. The debris chute 30 is adapted to catch any dust or other cutting debris produced by the action of the cutting member 22 that falls through the work table 12 and passes through the open bottom of housing 14. The debris chute 30 is preferably positioned on an incline having a slope running downward in a direction generally from the infeed edge 16 toward the outfeed edge 18 of work surface 12. Accordingly, it will be appreciated by the skilled artisan that the debris chute 30 utilizes the force of gravity to direct any debris landing thereon toward the lower edge 33 of the debris chute, which opens away from the position typically occupied by an operator. As illustrated in FIG. 9A, at least one side edge of the flow surface can further comprise at least one flange 35 integral thereto for directing debris falling thereon onto the flow surface. The flange 35 is shown in FIG. 9A for illustrative purposes only and the determination of the specific configuration including the dimensions of the flange 35 is within the level of ordinary skill in the art and thus the specific configuration of the flange does not form any part of the present invention.

Figure 9:
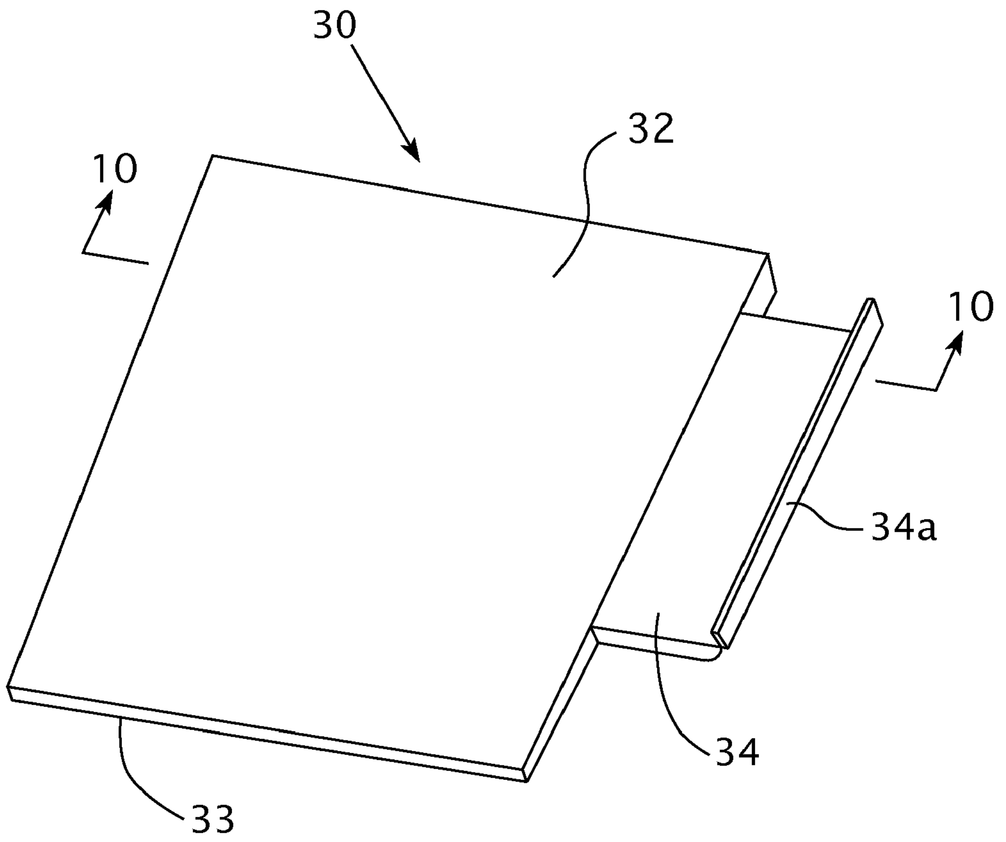
FIG. 9 is an isometric view of the debris collection system included in FIG. 1, shown in isolation.
Figure 10:
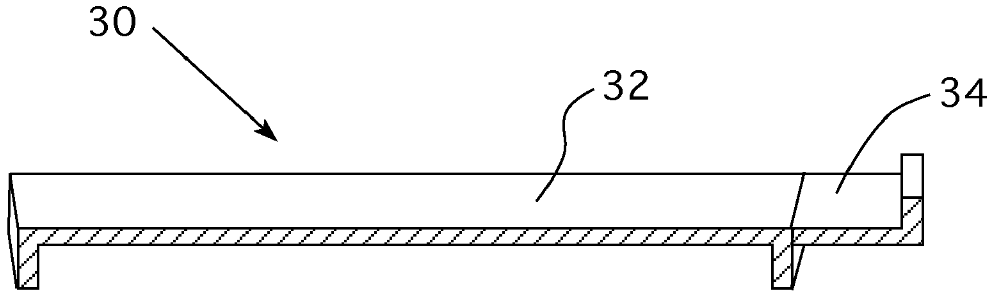
FIG. 10 is a side cross-sectional view of the debris collection system of FIG. 9, taken along the line 10-10 in FIG. 9.
Figure 9A:
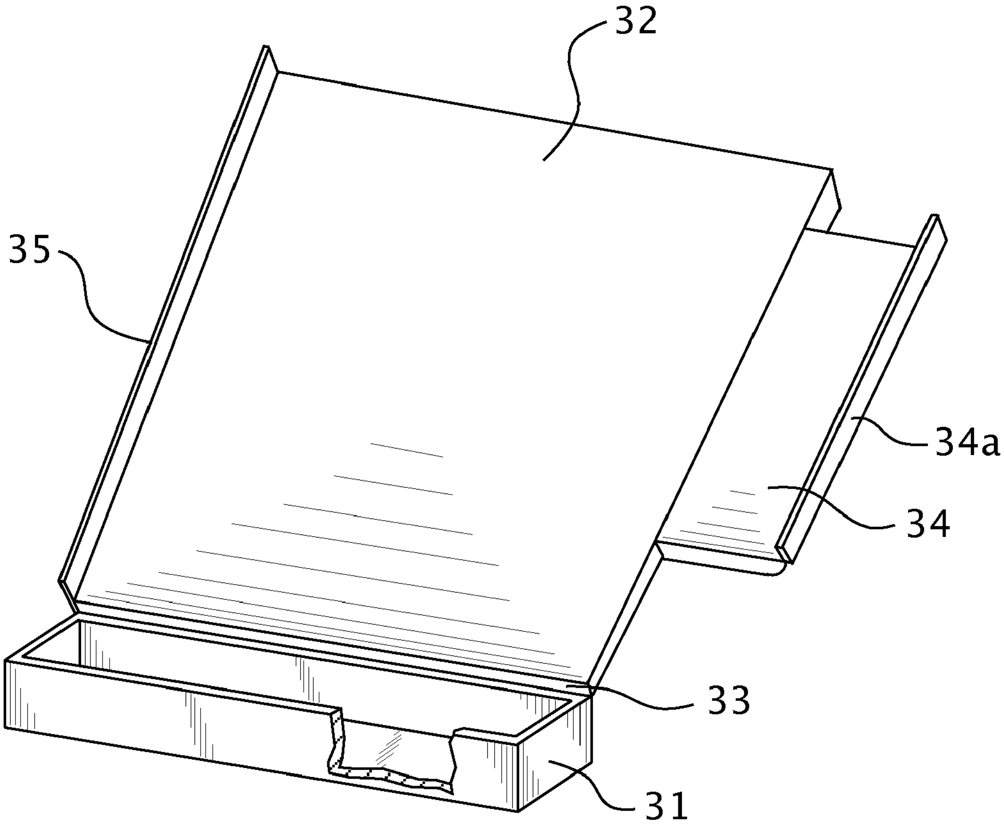
FIG. 9A is an isometric view of a debris collection system in accordance with an alternative embodiment of the present invention.

As can be seen in particular in FIGS. 9 and 10, the debris chute 30 may generally include a flow surface 32 bordered along one side by an accessory shelf 34. The flow surface 32 may be in the form of a generally planar rectangular sheet formed of rigid material such as steel or the like, and having a smooth surface area throughout. The accessory shelf 34 includes a flange **34*a* preferably formed from the same material as the flow surface 32 and is disposed along the length of one side of the flow surface 32, integral thereto. The shelf 34 is adapted to hold saw accessories, for example, a saw fence, thereon when they are not in use. Thus, unlike conventional arrangements in which debris is allowed to fall directly onto the floor beneath the saw, it will be appreciated that the debris chute 30 is adapted to guide, or direct, debris falling onto the flow surface 32 to the lower edge 33 thereof. The lower edge 33 of debris chute 30 may additionally be provided with a debris reservoir disposed along the length thereof to collect sawdust and other debris directed to the lower edge 33. The debris reservoir may include, for example, a box or bag adapted to catch and hold any debris traveling down the debris chute 30 and provide for improved ease in the disposal thereof. More specifically, the debris reservoir may comprise a chamber adapted to accept debris from the flow surface 32, the chamber having two or more integral sides, an integral bottom, and an open top for accepting debris from the flow surface 32, the open top being disposed along the lower edge of the flow surface 32. A chamber in the form of a box 31 is shown in FIG. 9A for illustrative purposes only and the determination of the specific configuration including the dimensions of the features of the box 31 is within the level of ordinary skill in the art. Thus, while the presence of the general features of the two or more integral sides, the integral bottom, and the open top of the box are considered to form part of the present invention, the specific configurations of these features as shown in FIG. 9A do not form any part of the present invention. Accordingly, the debris chute 30 represents an improvement over conventional arrangements in that it restricts the area of distribution of sawdust and other cutting debris around the saw 10 and provides for increased ease of clean-up for the workshop or other location of the table saw 10**.

Figure 11:
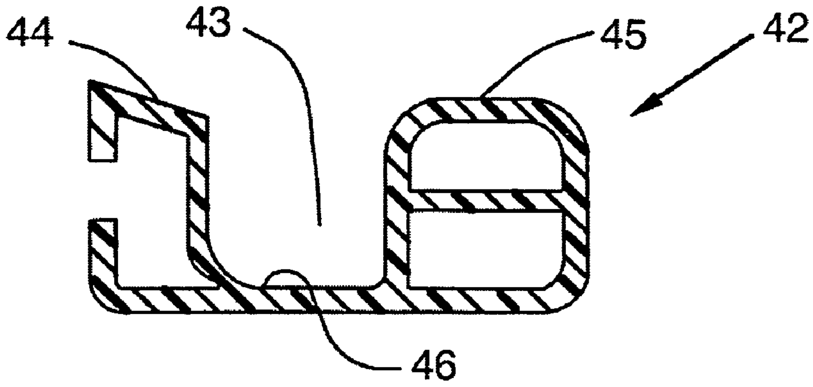
FIG. 11 is a side cross-sectional view in isolation of the infeed rail of the workpiece guide system included in FIG. 1.
Figure 12:
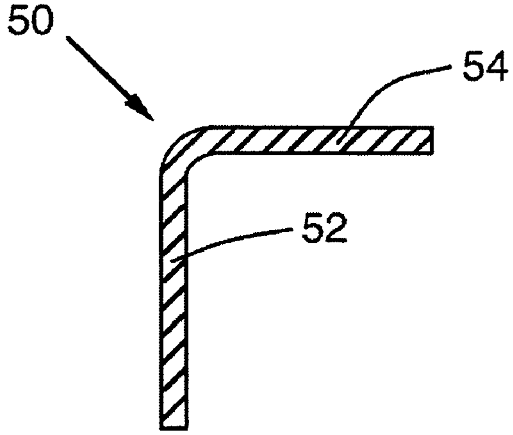
FIG. 12 is a side cross-sectional view in isolation of the outfeed rail of the workpiece guide system included in FIG. 1, in isolation.
Figure 18:
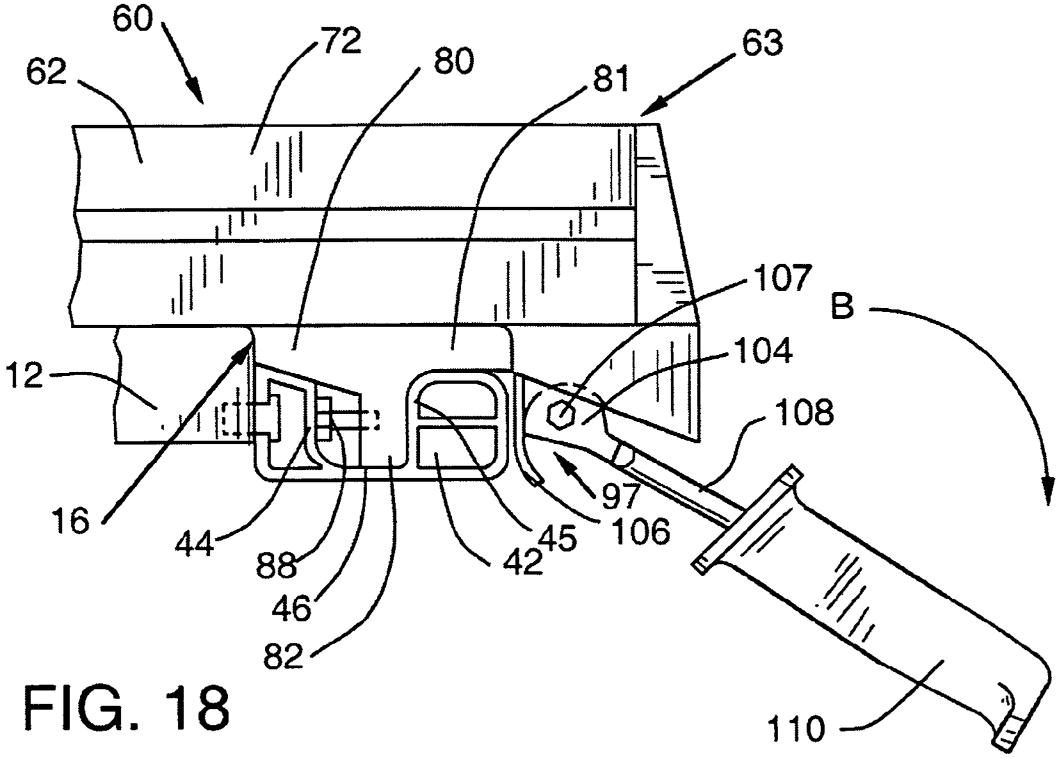
FIG. 18 is a side view depicting the workpiece guide of FIGS. 13-16 shown positioned on the infeed rail and in the clamped position.

The table saw 10 may further include a novel rail system 40 for the attachment of accessories such as workpiece fences and other workpiece holding and positioning accessories thereto. A preferred rail system 40 of the present invention will now be described with reference to FIGS. 1-8 and 11-12. As can be seen in those Figures, the rail system 40 generally includes an infeed rail 42 and an outfeed rail 50. The infeed rail 42 is in the form of an elongate bar, formed from a rigid material such as aluminum, steel or the like, and having a generally U-shaped cross-section throughout its length. Thus, as seen in particular in FIG. 11, the U-shaped cross-section of the infeed rail 42 defines a trough 43 having an inner arm 44, an outer arm 45, and a bottom 46. Such an arrangement provides an improved selection of surfaces for clamping accessory devices such as workpiece guide 60 (the operation and construction of which will be described below) to saw 10. The infeed rail 42 is disposed parallel to the infeed edge 16 of the work surface 12 and is fixedly connected thereto by, for example, bolts, welds, or other suitable connectors known in the art. This particularly advantageous construction allows the infeed rail 42 to be disposed so as to directly abut infeed edge 16 of work surface 12 over its entire length such that no gap exists between infeed rail 42 and infeed edge 16. That arrangement is particularly shown in FIG. 7 and also is illustrated in FIG. 18, described in greater detail below.

In conventional rail arrangements, the infeed rail is typically a tubular member that must be positioned such that a gap exists between the rail and the work surface. Such an arrangement provides a space in which objects may become trapped and through which sawdust and other cutting debris may fall to the floor. It will be appreciated that the present rail system 40 addresses such drawbacks. As can be seen in particular in FIGS. 1-3, 7, and 8, the length of infeed rail 42 may be greater than that of the infeed edge 16 of work surface 12. Accordingly, a portion of infeed rail 42 may extend beyond the length of the infeed edge 16 of work surface 12 in order to increase the possible travel distance of accessories attached to the rail system 40.

The outfeed rail 50 of the rail system 40 includes an elongate member, formed from a rigid material such as steel, aluminum, or the like, and having a generally L-shaped cross-section throughout its length. Thus, as seen in particular in FIG. 12, the L-shaped cross-section of the outfeed rail 50 serves to define a bracket including a mounting plate 52 and a bracket plate 54 disposed in planes generally perpendicular to one another. The outfeed rail 50 is disposed parallel to the outfeed edge 18 of the work surface 12 and is fixedly mounted thereto by, for example, bolts, welds, or other suitable connectors. Such an arrangement provides improved clamping surfaces for attaching a portion of accessories, such as, for example, workpiece guide 60 (the operation and construction of which will be described below), across the work surface 12 of the table saw 10. Preferably, the outfeed rail 50 is disposed such that mounting plate 52 directly abuts the outfeed edge 18 of work surface 12 over its entire length such that no gap exists between outfeed rail 50 and outfeed edge 18. The positioning of the outfeed rail 50 in that way is indicated by, for example, FIGS. 7 and 19, the latter of which is described in greater detail below. Thus, it will be appreciated that the construction and positioning of the outfeed rail 50 may provide all or many of the same advantages derived from the construction and positioning of the infeed rail 42. The length of outfeed rail 50 may equal that of infeed rail 42, and as can be seen in particular in FIGS. 1-3, 7, and 8, the length of outfeed rail 50 may be greater length than that of outfeed edge 18 to augment the possible positioning of accessories attached to the rail system 40 relative to the cutting member 22.

As noted above, rail system 40 is conveniently adapted for use in attaching accessories to saw 10. One such accessory is workpiece guide 60 which is particularly adapted for use with the above-described embodiment of the rail system 40, and which incorporates novel features particularly adapted for positioning workpieces relative to the cutting member 22. However, although workpiece guide 60 is described herein for use in connection with rail system 40 and table saw 10, it will be appreciated that the workpiece guide 60 of the present invention may also be employed with other conventional rail systems and with cutting devices other than table saw 10. A possible construction of workpiece guide 60 will now be described with reference to FIGS. 1-8 and 13-19. As can be seen in particular in FIGS. 13-19, the workpiece guide 60 is adapted to be positioned atop work surface 12 and to span the length thereof in a substantially parallel relation to the plane of cutting member 22. Workpiece guide 60 is further adapted to selectively engage and slidingly ride on rail system 40. Workpiece guide or fence 60 generally includes a fence body or body 62, an infeed extension 64, and an attachment mechanism 66. The body 62 generally includes an elongate member, formed from a rigid material such as steel, aluminum, or the like, and having an infeed end 63 and an outfeed end 65. The length of body 62 is preferably greater than the width of the table saw 10 (defined herein as the distance between the infeed rail 42 and outfeed rail 50) such that the body 62 will overhang and extend beyond infeed rail 42 and outfeed rail 50.

The body 62 has rectangular cross-section which serves to define a hollow interior region 68 having a top surface 70, a bottom surface 71, and side faces 72 and 73. Preferably, the top surface 70 additionally includes one or more slots 74 therein. The slots 74 preferably include channels, having a T-shaped cross-section, and spanning the length of body 62. The T-shaped cross-section of the slots 74 is adapted to accept various saw accessories including, for example, fingerboards, push sticks, and other accessories as are known in the art. (See FIG. 13) The side faces 72 and 73 include smooth surfaces positioned generally perpendicular to the plane of top and bottom surfaces 70 and 71, respectively, and adapted to allow workpieces to slide therealong. The bottom surface 71 preferably includes a pair of slots 76 disposed thereon and running the length thereof. The pair of slots 76 preferably include two channels 77 and 78 having T-shaped cross-sections and adapted to accept attachment mechanism 66 therein. (See FIG. 16) The construction and operation of attachment mechanism 66 will be further described further below.

The present workpiece guide 60 also includes a unique and novel infeed extension 64, the construction and operation of which will now be described. The infeed extension 64 generally includes a delta-shaped work supporting surface 67 portion, integral to the body 62, and formed from a rigid material such as aluminum, steel or the like. (See FIGS. 13, 15, and 16) The work supporting surface 67 of the infeed extension 64 is oriented beneath body 62 at the infeed end 63 thereof. Accordingly, the infeed extension 64 serves to define two infeed platforms 85 and 86 positioned adjacent to side faces 72 and 73 of body 62, respectively, and which may be positioned so that the work supporting surface 67 is generally coplanar with work surface 12 when workpiece guide 60 is mounted on saw 10. The infeed extension 64 is further adapted to abut infeed edge 16 of work surface 12 and to form a protrusion therefrom extending beyond infeed rail 42, generally in the direction of the operator. (See FIGS. 1, 2, and 7) The infeed extension 64 may also include an indicator 120 in the surface thereof for reading witness lines (not shown) on the infeed rail 42 so as to indicate the distance between the side faces 72 and 73 of the body 62 and the cutting member 22. The infeed extension 64 may support workpieces that are being advanced into the cutting member 22 and that extend beyond the infeed edge 16 of the work surface 12. It will thus be appreciated that the inclusion of infeed extension 64 on workpiece guide 60 represents an improvement over the prior art in that it provides for increased support of workpieces being fed into the saw 10 during, for example, rip-cutting operations.

Figure 17:
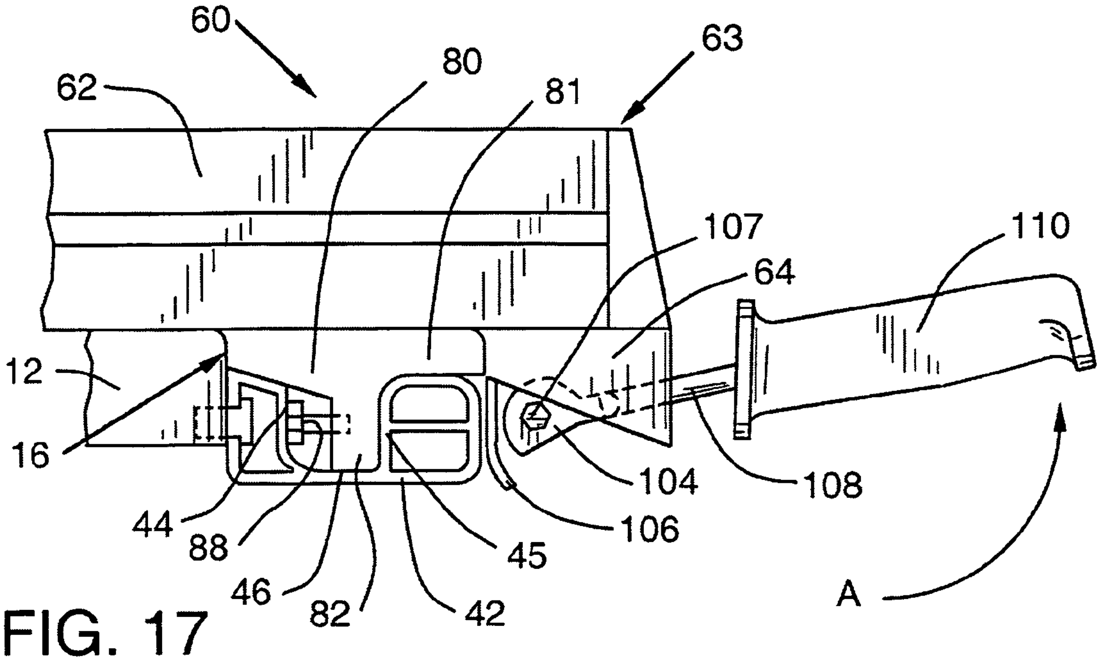
FIG. 17 is a side view depicting the workpiece guide of FIGS. 13-16 shown positioned on the infeed rail and in the open position.

Preferably, workpiece guide 60 further includes support elements adapted to support infeed extension 64 on infeed rail 42. In the embodiment shown in the FIGS. 15-19, the support elements include an elongated bracket member 80 which is adapted to slidably support infeed extension 64 and workpiece guide 60 on infeed rail 42. In one embodiment, bracket member 80 is an L-shaped bracket member defined by arms 81 and 82 running transverse to body 62 beneath infeed extension 64 and adapted to slidably engage infeed rail 42. The relationship of those elements is indicated in, for example, FIGS. 14, 17, and 19. In particular, when the workpiece fence 60 is positioned on table saw 10, arm 81 is oriented generally parallel with the surface of infeed extension 64 and is adapted to sit atop outer arm 45 of infeed rail 42. Arm 82 is oriented generally perpendicular to the surface of infeed extension 64 and is adapted to be slidably seated within trough 43 abutting outer arm 45, as is generally shown in FIGS. 17 and 18. Arm 82 may additionally include lateral adjustment mechanism 88 protruding therefrom in the direction of inner arm 44 of infeed rail 42. Lateral adjustment mechanism 88 includes threaded members 87 and 89. See FIG. 16. The threaded members 87 and 89 may include bolts, screws, or the like that are seated within threaded bores (not shown) in the surface of arm 82. Accordingly, it will be appreciated that threaded members 87 and 89 may be selectively adjusted within the threaded bores (not shown) to seat against inner arm 44 and thereby increase the contact pressure within the trough 43 between bracket member 80 and infeed rail 42. Such construction allows for adjustment of the force required to slide the fence 60 along infeed rail 42. Such construction also increases the stability of the fence 60 within infeed rail 42. Accordingly, such construction of the fence 60 and infeed rail 42 provides consistent support to workpieces placed thereon.

Figure 13:
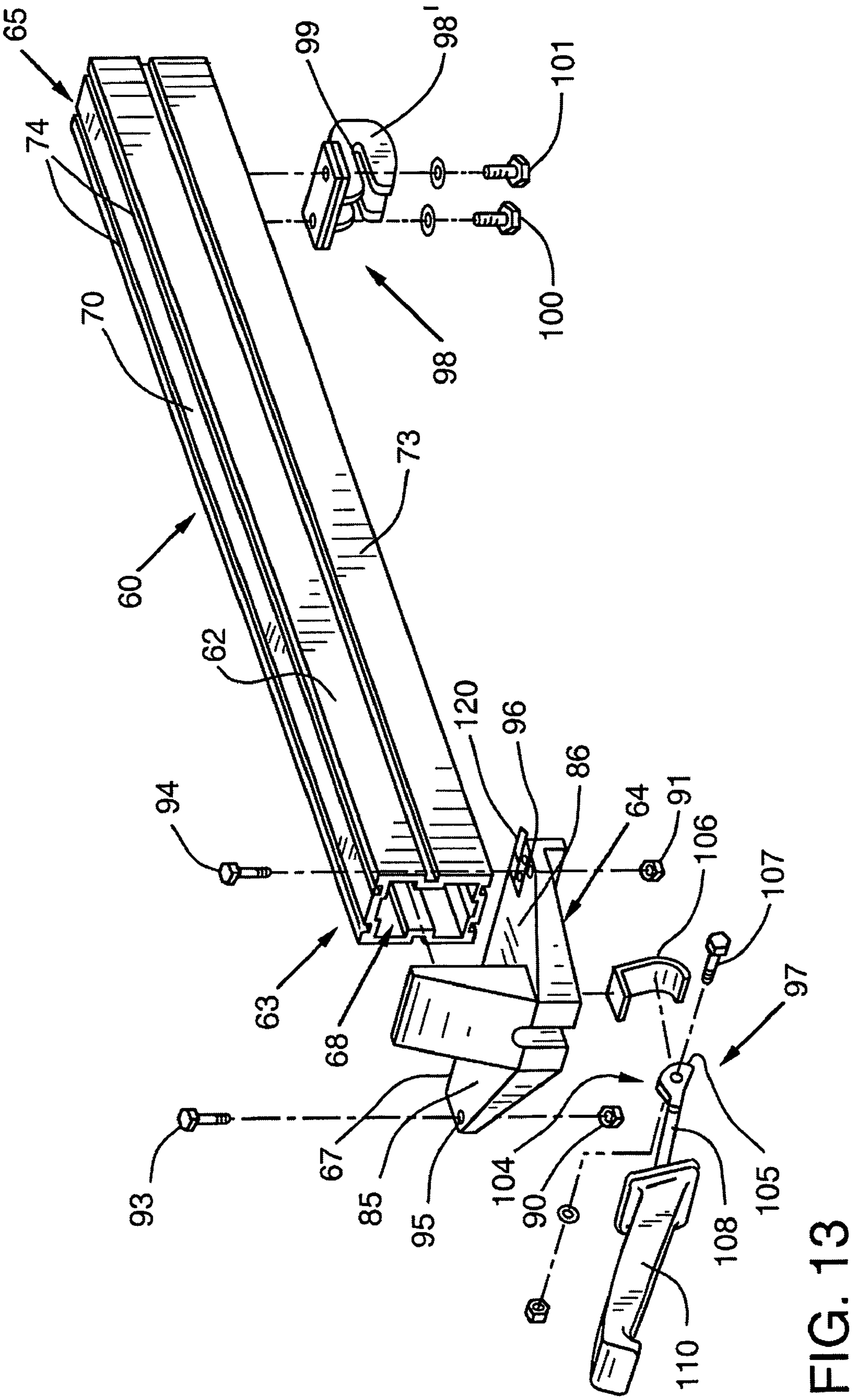
FIG. 13 is a plan view of the workpiece guide of the workpiece guide system included in FIG. 1.
Figure 14:
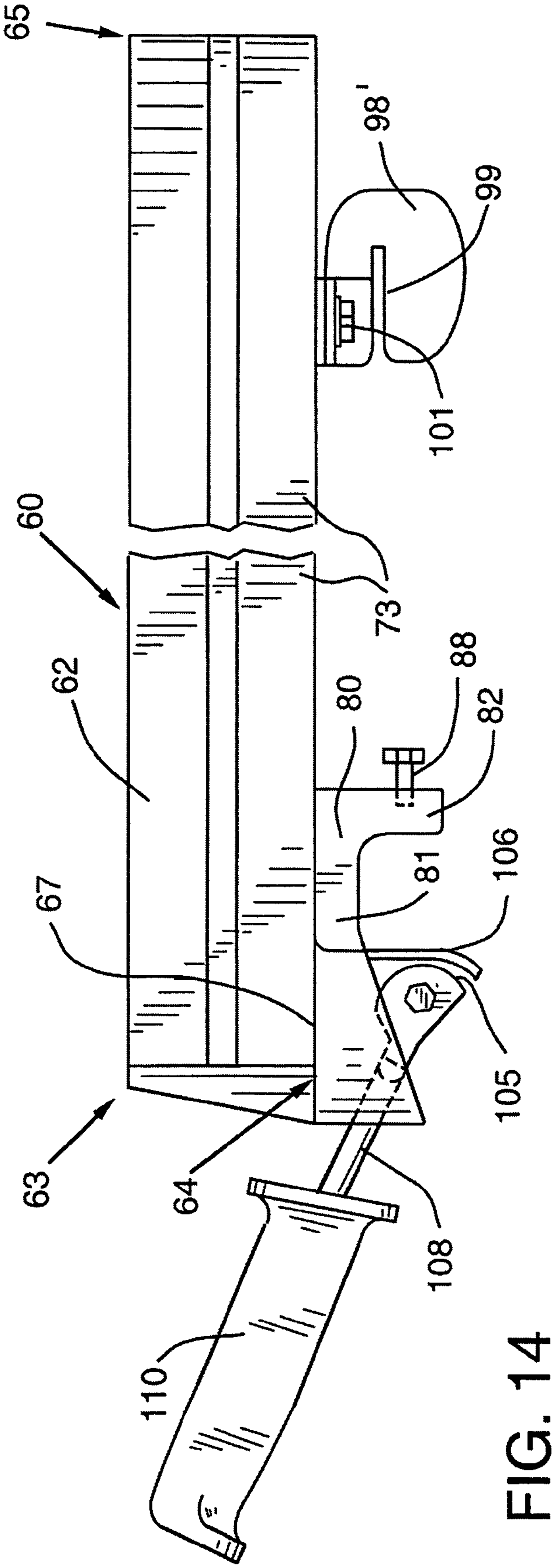
FIG. 14 is a side elevational view of the workpiece guide of FIG. 13.
Figure 15:
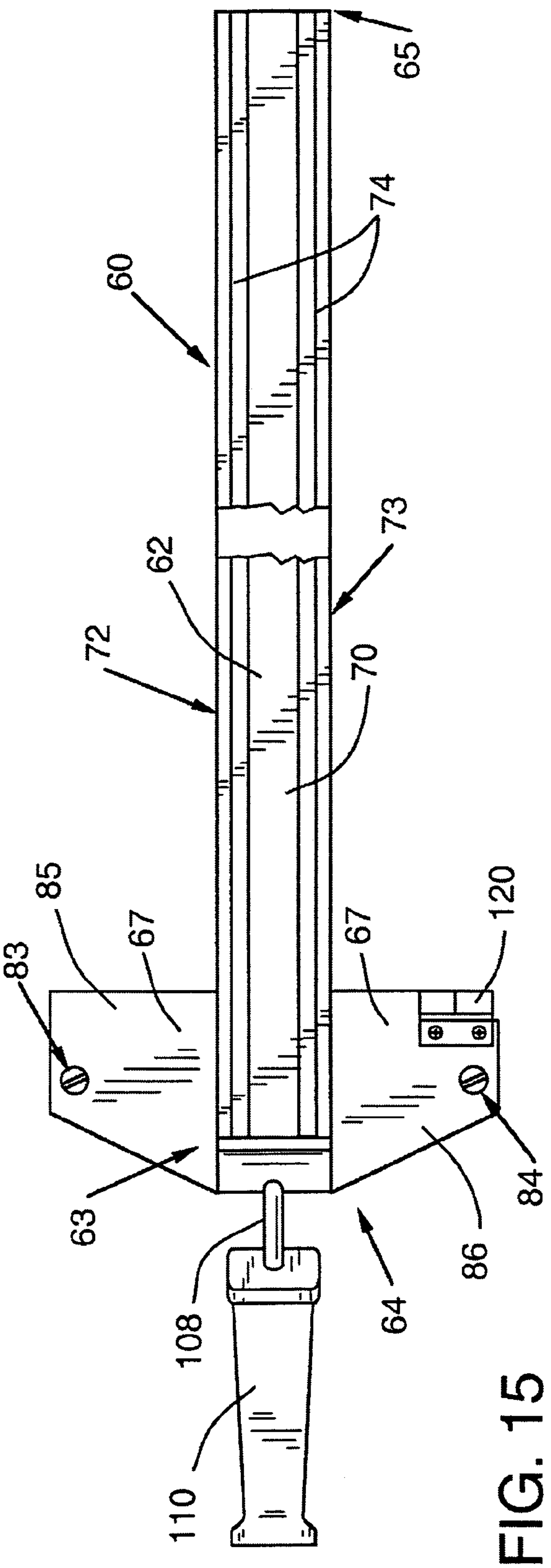
FIG. 15 is a top view of the workpiece guide of FIGS. 13 and 14.
Figure 16:
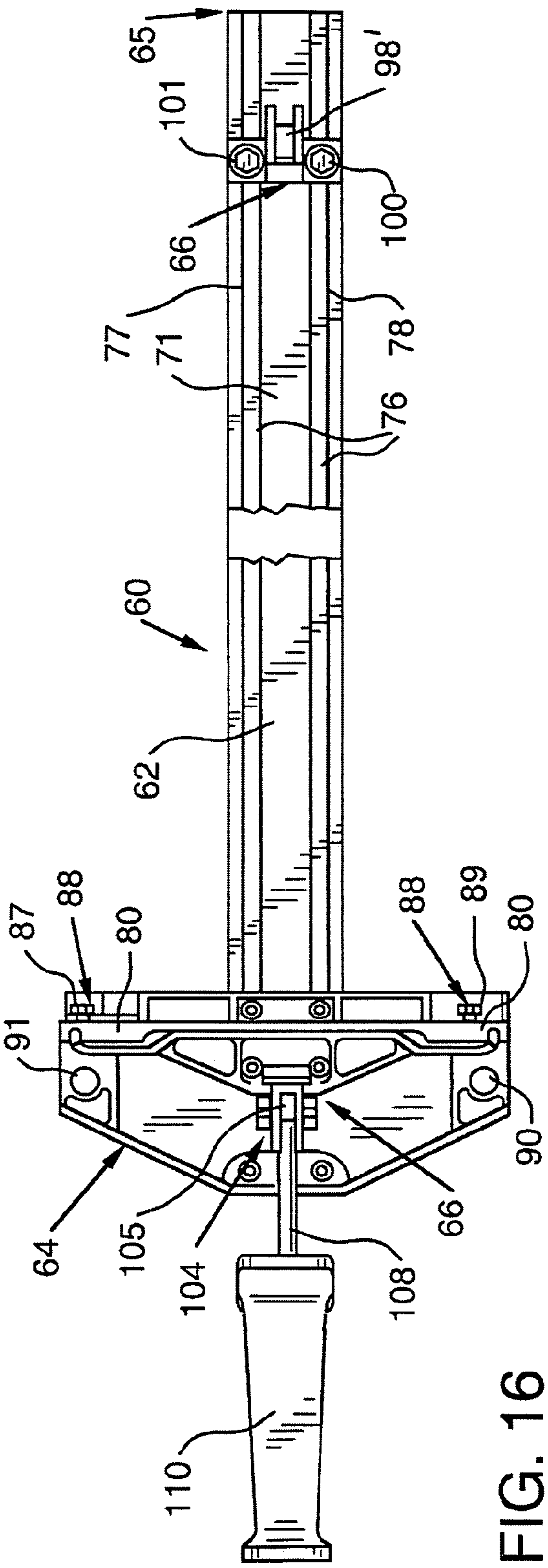
FIG. 16 is a bottom view of the workpiece guide of FIGS. 13-15.

The present infeed extension 64 further includes height adjustment mechanisms 83 and 84 adapted to adjustably support infeed extension 64 on infeed rail 42 within trough 43. The height adjustment mechanisms 83 and 84 are adapted to adjust the height of infeed extension 64 relative to work surface 12 and to allow the work supporting surface 67 of infeed extension 64 to be adjusted so as to be generally coplanar with work surface 12. Accordingly, height adjustment mechanisms 83 and 84 include bases 90 and 91 mounted to each infeed platform 85 and 86, respectively, by a threaded member 93 and 94, respectively, as indicated in FIG. 13. Threaded members 93 and 94 may be, for example, screws, bolts, or other suitable members characterized by a threaded shaft having a head at one end and a base 90 and 91 is secured to the threaded end of each threaded member 93 and 94, respectively. Threaded members 93 and 94 are mounted in threaded bores 95 and 96, respectively, positioned along the edge of infeed platforms 85 and 86, respectively. Bases 90 and 91 are adapted to be seated atop infeed rail 42. The heads of threaded members 93 and 94 are preferably adapted for actuation by conventional means such as a screw driver, allen wrench, or the like, and are recessed within threaded bores 95 and 96 such that they do not protrude from the work supporting surface 67 of the infeed platforms 85 and 86. Accordingly, it will be understood that rotation of the threaded members 93 and 94 within the threaded bores 95 and 96 will cause infeed platforms 85 and 86, respectively, to be raised or lowered relative to infeed rail 42. It will further be appreciated that the threaded members 93 and 94 may be independently adjusted within threaded bores 95 and 96, respectively, to independently adjust the height of the infeed platforms 85 and 86, respectively. The present infeed extension 64 thus represents an improvement over the prior art because it is fully supported on infeed rail 42 and does not obstruct the area normally occupied by the operator, and also is easily adjustable during use.

Figure 19:
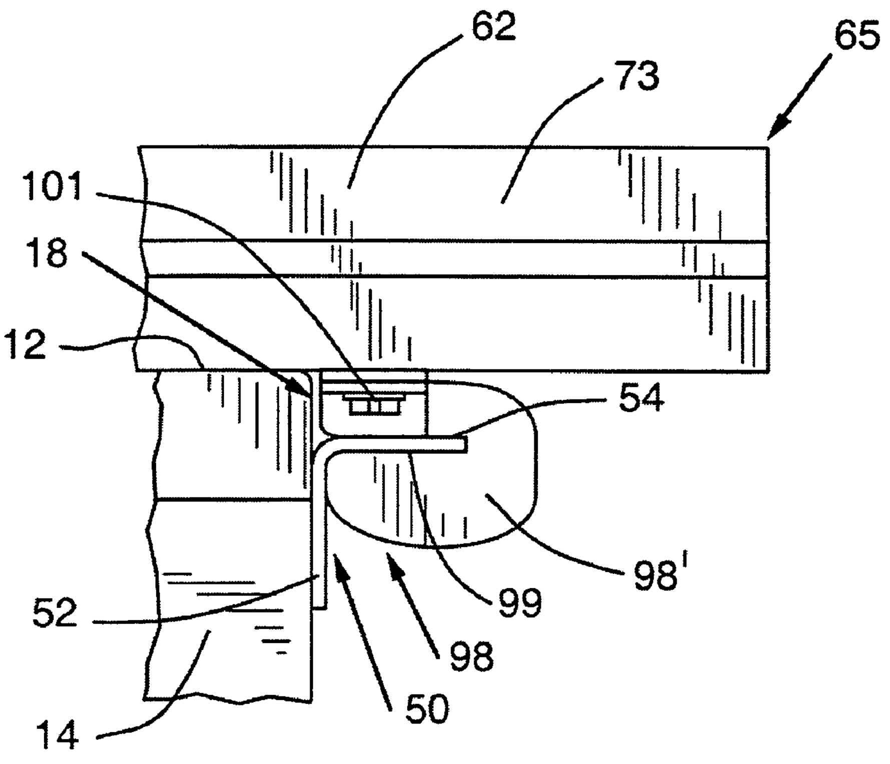
FIG. 19 is a side view of the means of attachment between the workpiece guide of FIGS. 13-16 and the outfeed rail.

Workpiece guide 60 further includes attachment mechanism 66 adapted to releasably secure the workpiece guide 60 to the rail system 40. While the workpiece guide 60 depicted and described herein is particularly adapted to be used with rail system 40, it will be appreciated that the workpiece guide 60 of the present invention may be adapted for use with a variety of conventional rail systems as well. As shown in particular in FIGS. 13-19, the attachment mechanism 66 includes an infeed rail attachment mechanism 97 and an outfeed rail attachment mechanism 98. The outfeed rail attachment mechanism 98 includes a bracket 98' formed from a rigid material such as steel or the like, defining a slot 99 adapted to accept bracket plate 54 of outfeed rail 50 therein, as is shown in FIG. 19. Accordingly, it will be appreciated that the outfeed rail attachment mechanism 98 is adapted to prevent the fence 60 from lifting off of the work surface 12 during use and maintains the fence 60 in a parallel relation to the plane of cutting member 22. The outfeed rail attachment mechanism 98 is slidably attached to body 62 by fasteners 100 and 101, which are seated within slots 76 on the bottom 71 of body 62 and are adapted to anchor the outfeed rail attachment mechanism 98 to body 62. Accordingly, the fasteners 100 and 101 are adapted to fit within the T-shaped cross-section of slots 76 and may be positioned and secured at a selected location along the length thereof. Fasteners preferably include threaded nuts disposed within the slots 76 and bolts or screws running through mounting plate 52 threaded therethrough. Thus, it will be appreciated that fasteners 100 and 101 may be selectively tightened to fixedly clamp the outfeed rail attachment mechanism 98 at any point along the length of the body 62 and may be loosened to provide for free movement of outfeed rail attachment mechanism 98 along the length of body 62. Accordingly, such construction allows workpiece guide 60 of the present invention to be adjusted to fit cutting devices having work surfaces of various sizes.

Infeed rail attachment mechanism 97 includes a clamp 104, a clamp plate 106, and a lever 108. As shown in particular in FIGS. 17 and 18, the clamp 104 includes a cam-shaped surface 105 thereon. Clamp 104 is journaled to body 62 beneath infeed extension 64 at the infeed end 63 of the body 62 so that it may rotate about a shaft 107. Clamp plate 106 is in the form of a curved plate, formed from a rigid material such as steel, and having an inner surface that generally corresponds to cam-shaped surface 105 of clamp 104. As indicated in FIG. 17, the clamp plate 106 is at least partially disposed between clamp 104 and infeed rail 42 when the workpiece guide 60 is positioned on the rail system 40. The cam further include lever 108 integral thereto. Lever 108 includes a shaft, which may include a handle 110 at the end thereof, and that is adapted to rotate clamp 104 about shaft 107. Lever 108 and clamp 104 are preferably formed from a single unitary piece of rigid material, such as steel or the like, such that lever 108 protrudes therefrom and may be conveniently manipulated by an operator. However, lever 108 may alternatively be formed from a separate piece of material that is threadedly or otherwise connected to clamp 104.

The infeed rail attachment mechanism 97 may be reciprocated between either of a clamped position, shown in FIG. 18, or an open position, shown in FIG. 17, by the lever 108. As indicated in FIG. 18, by rotating the lever 108 downward in the direction indicated by the arrow B in that figure, the surface 105 of clamp 104 is brought into contact with a surface of clamp plate 106 and biases the clamp plate 106 into contact with the infeed rail 42, thereby securing the workpiece guide 60 on the rail system 40 at a desired location. To unsecure the workpiece guide 60, the lever 108 is rotated about shaft 107 in the direction indicated by the arrow A of FIG. 17, thereby moving surface 105 of clamp 104 out of engagement with clamp plate 106 to release the clamping force between clamp plate 106 and infeed rail 42. Accordingly, infeed rail attachment mechanism 97 represents an improvement in that it allows for improved ease of adjustment of workpiece guide 60. In particular, when lever 108 is in the unclamped position, as shown in FIG. 17, surface 105 of clamp 104 is not in contact with clamp plate 106 and thus no clamping pressure is being exerted on the outer arm 45 of infeed rail 42 by infeed rail attachment mechanism 97. In this position, fence 60 is free to slide along the length of rail system 40. When lever 108 is actuated into the clamped position, as shown in FIG. 18, clamp plate 106 is forced into frictional contact against outer arm 45 of infeed rail 42, and workpiece guide 60 is locked in place along the length of rail system 40.

As can be appreciated from the above description, the workpiece guide and debris collection system of the present invention provide distinct advantages over conventional designs. For example, the workpiece guide provides a consistent and solid infeed surface without obstructing the operator's work space. The infeed surface provides for the improved support of workpieces during, for example, ripcutting operations. The workpiece guide adjustment features provide for height adjustment and leveling of the infeed surface. The infeed surface's integral arrangement with the body of the fence further increases the ease with which the workpiece guide may be adjusted. The fence rail system of the present invention also provides advantages over prior fence rail systems. For example, the present fence rail system incorporates improved clamping surfaces and thus provides for improved ease of attachment of accessories thereto. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. A saw comprising:

a work surface comprising a substantially horizontal plane including an infeed edge and an outfeed edge;

a rail system comprising an infeed rail disposed along said infeed edge and an outfeed rail disposed along said outfeed edge;

a workpiece guide slidably disposed on said rail system, said workpiece guide comprising an elongated body and an infeed extension, said elongated body including an infeed end and an outfeed end;

a support structure;

a housing positioned atop said support structure and comprising a cutting member adapted to cut workpieces, said work surface supported by said housing;

a debris collection system attached to said support structure and positioned beneath said housing, said debris collection system comprising a generally planar rigid sheet, said rigid sheet comprising an inclined flow surface that is inclined in a longitudinal direction extending to a lower edge and is bordered by at least one side edge, wherein said at least one side edge extends substantially in said longitudinal direction, and wherein said lower edge extends in a transverse direction terminating at said at least one side edge; and an accessory shelf disposed adjacent to and integral with one of said at least one side edge of said rigid sheet and accessible to an operator of the saw, said accessory shelf having a surface extending substantially in said longitudinal direction and extending outwardly from said one edge of said rigid sheet substantially in said transverse direction.

2. The saw of claim 1, wherein said at least one side edge of said flow surface further comprises at least one flange integral thereto for directing debris falling thereon onto said flow surface and said debris collection system further comprises a debris reservoir disposed along the lower edge of said flow surface for accepting debris from said flow surface.

3. The saw of claim 2, wherein said at least one flange is angled upward relative to the plane of said inclined flow surface.

4. The saw of claim 2, wherein said lower edge is adjacent to and beneath said outfeed edge.

5. The saw of claim 4, wherein said debris reservoir further comprises a chamber having two or more integral sides, an integral bottom, and an open top for accepting debris from said flow surface, said open top disposed along the lower edge of said flow surface.

6. The saw of claim 5, wherein said housing has an outer perimeter and one of said lower edge and said at least one side edge is positioned outside of said outer perimeter of said housing.

7. The saw of claim 6, wherein said work surface has an outer perimeter and one of said lower edge and said at least one side edge is positioned outside of said outer perimeter of said work surface.

8. A saw comprising:

a support structure;

a housing positioned atop said support structure and comprising a cutting member adapted to cut workpieces;

a debris collection system attached to said support structure and positioned beneath said housing, said debris collection system comprising a generally planar rigid sheet, said rigid sheet comprising an inclined flow surface that is inclined in a longitudinal direction extending to a lower edge and is bordered by at least one side edge, wherein said at least one side edge extends substantially in said longitudinal direction, and wherein said lower edge extends in a transverse direction terminating at said at least one side edge; and an accessory shelf disposed adjacent to and integral with one of said at least one side edge of said rigid sheet and accessible to an operator of the saw, said accessory shelf having a surface extending substantially in said longitudinal direction and extending outwardly from said one edge of said rigid sheet substantially in said transverse direction, wherein said at least one side edge of said rigid sheet further comprises at least one flange integral thereto adapted to direct debris falling thereon onto said flow surface, wherein said debris collection system further comprises a debris reservoir disposed along said lower edge of said flow surface, and wherein said debris reservoir comprises a chamber including two or more integral sides, an integral bottom, and an open top, said chamber adapted to accept debris from said flow surface, said open top disposed along said lower edge of said flow surface.

9. The saw of claim 8, wherein said at least one flange is angled upward relative to the plane of said inclined flow surface.

10. The saw of claim 8, wherein said saw further includes a work surface comprising an infeed edge and an outfeed edge and wherein said lower edge is adjacent to and beneath said outfeed edge.

11. The saw of claim 8, wherein said housing has an outer perimeter and one of said lower edge or said at least one side edge is positioned outside of said outer perimeter of said housing.

12. The saw of claim 8, wherein said saw further comprises a work surface having an outer perimeter and one of said lower edge and said at least one side edge is positioned outside of said outer perimeter of said work surface.

13. The saw of claim 8, further comprising:

a work surface attached atop said housing comprising a substantially horizontal plane including an infeed edge and an outfeed edge;

a guide rail system comprising an infeed rail disposed along said infeed edge and an outfeed rail disposed along said outfeed edge; and a workpiece guide slidably disposed on said guide rail system, said workpiece guide comprising an elongated body and an infeed extension, said elongated body comprising an infeed end and an outfeed end.

14. The saw of claim 13, wherein said elongated body further comprises two side walls oriented perpendicular to the work surface, said infeed extension integral to said infeed end of said body and comprising an infeed platform adjacent to each of said two side walls.

15. The workpiece guide of claim 14, wherein said infeed extension is slidably supported by said infeed rail.

16. The workpiece guide of claim 15, wherein said infeed extension further comprises at least one support adapted to slidably support said infeed extension on said infeed rail.

17. The workpiece guide of claim 16, wherein said at least one support comprises an elongated member attached to the underside of said infeed extension having a complimentary shape to at least a portion of said infeed rail.

18. The workpiece guide of claim 14, wherein each said infeed platforms further comprises an adjustment mechanism.

19. The workpiece guide of claim 18, wherein said adjustment mechanism of each said infeed platforms comprises a threaded bore in each said infeed platform having a threaded member disposed therethrough, said threaded member having a base portion and a head portion and adapted to exert an opposing force on said infeed rail.

20. The workpiece guide of claim 19, wherein said base portion of said threaded member is adapted to slidably engage said infeed rail.

21. The workpiece guide of claim 19, wherein said head portion of said threaded member is recessed within the surface of said infeed platform.

22. The workpiece guide of claim 14, wherein said elongated body comprises a saw fence.

* * * * *

UNITED STATES PATENT AND TRADEMARK OFFICE

CERTIFICATE OF CORRECTION

PATENT NO. : 7,594,459 B2
APPLICATION NO. : 10/990694
DATED : September 29, 2009
INVENTOR(S) : David Miller et al.

It is certified that error appears in the above-identified patent and that said Letters Patent is hereby corrected as shown below:

Column 5, line 23, delete "button" and replace therewith --bottom--.

Signed and Sealed this

Twenty-first Day of September, 2010

David J. Kappos
*Director of the United States Patent and Trademark Office*